(12) United States Patent
Uehara et al.

(10) Patent No.: US 6,384,594 B1
(45) Date of Patent: May 7, 2002

(54) REVOLUTION SPEED DETECTING APPARATUS FOR EXTRACTING SIGNAL CORRESPONDING TO REVOLUTION SPEED

(75) Inventors: Yasuo Uehara, Toyota; Yasutada Tanabe; Toshiaki Suzuki, both of Tochigi, all of (JP)

(73) Assignees: Toyota Jidosha Kabushiki Kaisha, Toyota; Kawada Industries, Inc., Tokyo, both of (JP)

( * ) Notice: Subject to any disclaimer, the term of this patent is extended or adjusted under 35 U.S.C. 154(b) by 0 days.

(21) Appl. No.: 09/626,083

(22) Filed: Jul. 26, 2000

(30) Foreign Application Priority Data

Jul. 26, 1999 (JP) ............................................. 11-210704

(51) Int. Cl.$^7$ ................................................. G01P 3/48
(52) U.S. Cl. ........................ 324/173; 324/162; 324/225
(58) Field of Search ................................. 324/173, 174, 324/160, 166, 161, 162, 163, 165, 207.15, 207.25; 702/148

(56) References Cited

U.S. PATENT DOCUMENTS

| | | |
|---|---|---|
| 3,996,590 A | 12/1976 | Hammack |
| 4,699,046 A | 10/1987 | Bellieni et al. |
| 4,807,164 A | 2/1989 | Onyon ........................ 364/565 |
| 5,012,188 A | 4/1991 | Kubo et al. .................. 324/160 |
| 5,539,308 A * | 7/1996 | Teramae et al. ............. 324/173 |
| 5,541,859 A | 7/1996 | Inoue et al. |
| 5,557,552 A * | 9/1996 | Natio et al. .................. 364/565 |
| 5,566,094 A | 10/1996 | Kojima et al. |
| 5,748,503 A | 5/1998 | Saeki et al. |

FOREIGN PATENT DOCUMENTS

| | | |
|---|---|---|
| DE | 33 41 173 | 5/1985 |
| EP | 0 557 554 | 9/1993 |
| JP | 57-175259 | 10/1982 |
| JP | 09-1133527 | 5/1997 |
| JP | 09-281125 | 10/1997 |

* cited by examiner

Primary Examiner—Edward Lefkowitz
Assistant Examiner—Subhash A Zaveri
(74) Attorney, Agent, or Firm—Kenyon & Kenyon

(57) ABSTRACT

Through differentiation of input signal Vw from a sensor the angular frequency ω becomes included in the amplitude component. Through a plurality of differential operations the amplitude including the angular frequency ω varies, but the time-dependent term becomes equal. Since the amplitude of the signal Vw outputted from the revolution speed sensor 10 is approximately constant, the angular frequency ω proportional to the revolution speed can be extracted by determining a ratio thereof.

4 Claims, 3 Drawing Sheets

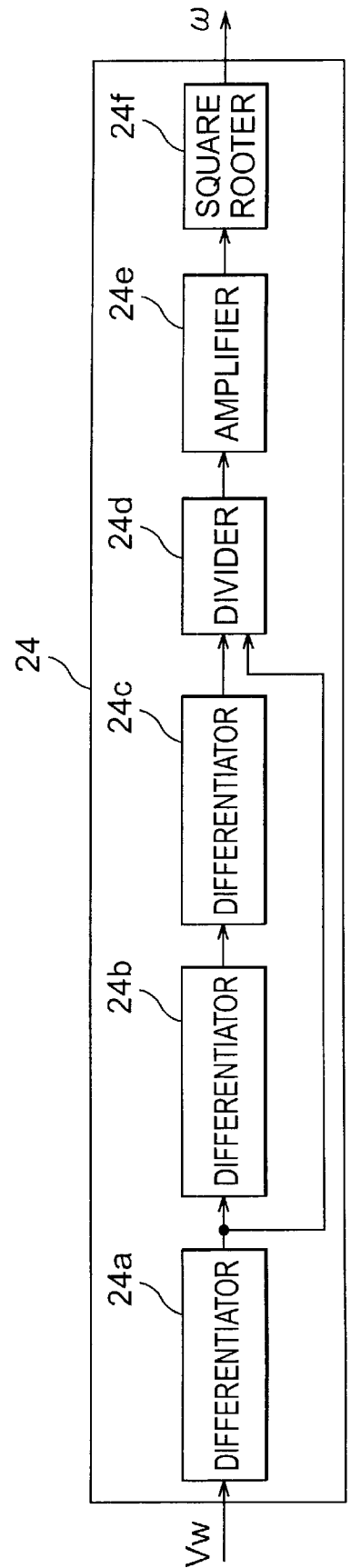

REVOLUTION SPEED DETECTING APPARATUS FOR EXTRACTING SIGNAL CORRESPONDING TO REVOLUTION SPEED

BACKGROUND OF THE INVENTION

1. Field of the Invention

The present invention relates to a revolution speed detecting apparatus and, more particularly, to a wheel speed detecting apparatus.

2. Related Background Art

A conventional revolution speed detector is described in Japanese Patent Application Laid-Open No. 9-281125. This device is constructed to extract a signal including angular frequency information according to revolution speed from an alternating-current (ac) signal outputted from a revolution speed sensor. Specifically, through differentiation of the ac signal such as a sine or cosine wave or the like, the angular frequency information becomes included in the amplitude component of signal, and thus it can be extracted.

SUMMARY OF THE INVENTION

However, because the amplitude of the revolution speed sensor varies according to the revolution speed, the component of angular velocity information included in the amplitude component becomes reduced relative to noise in a low revolution speed range, so that precise detection of revolution speed is not allowed in the low speed range.

The present invention has been accomplished in view of such a problem and an object of the invention is to provide a revolution speed detecting apparatus capable of detecting the revolution speed with improved detection accuracy.

In order to solve the problem, the present invention provides a revolution speed detecting apparatus for extracting a signal including angular frequency information corresponding to revolution speed from an ac signal outputted from a revolution speed sensor, wherein the amplitude of the ac signal is substantially constant and the ac signal is differentiated so as to permit the angular frequency information to be extracted by determining a ratio thereof.

According to the present apparatus, when the ac signal such as the sine or cosine wave or the like is differentiated, the angular frequency information becomes included in the amplitude component of signal. Through a plurality of differential operations the amplitude including the angular frequency information varies, but the time-dependent term comes to be equal. Since the amplitude of the ac signal outputted from the revolution speed sensor is substantially constant herein, the angular frequency information can be extracted by determining a ratio thereof. Since the apparatus is so constructed that the amplitude of the ac signal is substantially constant and that the above operation is carried out, the present apparatus is able to detect the revolution speed with improved detection accuracy even in such an extremely low speed range as the signal accuracy was null because of too small amplitude output, at least, before.

When the ac signal is a sine wave including the noise component and/or harmonic contents, the waveform of the signal is not a precise sine wave, but it is an approximate sine wave. In the present apparatus, the ac signal is preferably an approximate sine or cosine wave.

Since the present invention can restrain use of an integrator, which was indispensable for the operation heretofore, though not excluding it, the invention is able to decrease the time constant of the signal, so as to permit a stop judgment with high accuracy and an improvement in the detection accuracy of revolution speed to a stop.

In a preferred embodiment, the revolution speed sensor is located near a rotor to be detected, the rotor being comprised of an electroconductive or magnetic body and the circumference of the rotor being comprised of a plurality of portions arranged at predetermined intervals, and the revolution speed sensor comprises a coil for outputting the ac signal according to variation in eddy current or in magnetic permeability of the magnetic body appearing in the portions when the portions go into the vicinity of a magnetic field thereof with rotation.

Particularly, when the revolution speed sensor is a wheel speed sensor, the revolution speed of a wheel as a rotor to be detected can be detected with good responsivity and with accuracy even in the extremely low speed range.

BRIEF DESCRIPTION OF THE DRAWINGS

FIG. 3 is a block diagram to show the internal structure of processor 24.

DESCRIPTION OF THE PREFFERED EMBODIMENTS

An embodiment of the revolution speed detecting apparatus will be described hereinafter. Identical elements or elements having identical functions will be denoted by identical reference symbols and redundant description will be avoided.

Figure 1:
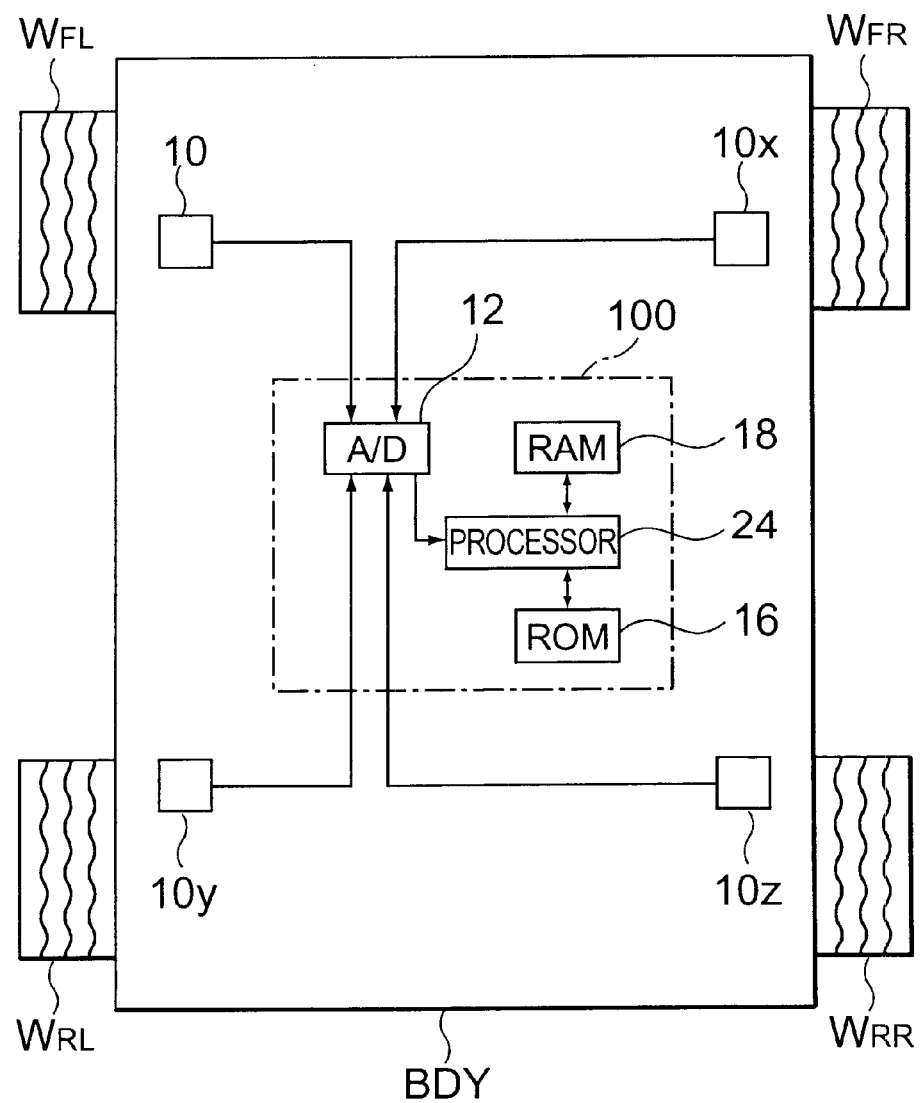
FIG. 1 is a schematic, structural diagram of a vehicle equipped with an embodiment of the wheel speed detecting apparatus.

FIG. 1 is a schematic, structural diagram of a vehicle equipped with the embodiment of the revolution speed detecting apparatus. The present revolution speed detecting apparatus is a wheel speed detecting device.

This vehicle is provided with four wheels (front wheels $W_{FL}$, $W_{FR}$ and rear wheels $W_{RL}$, $W_{RR}$) which are rotatable relative to the body BDY. A wheel speed sensor 10, 10x, 10y, or 10z is set corresponding to each of the wheels $W_{FL}$, $W_{FR}$, $W_{RL}$, $W_{RR}$ and output thereof is proportional to left or right wheel speed. In this embodiment, each wheel speed sensor 10, 10x, 10y, 10z detects the revolution speed of wheel and outputs an ac signal according to the revolution speed. The frequency or repetition frequency of the ac signal is proportional to the revolution speed.

The output from each sensor 10, 10x, 10y, or 10z is supplied to an ECU (electronic control unit) 100 placed inside the vehicle and the ECU 100 calculates the wheel speed of each wheel, based on the input information, displays vehicle speed computed from the wheel speeds thus calculated, and controls driving means (for example, brakes, suspension, etc.) for controlling body behavior, based on the wheel speeds, as occasion arises. For example, the ECU 100 executes control of brake oil pressures at the wheels $W_{FL}$, $W_{FR}$, $W_{RL}$, $W_{RR}$ in the ABS (antilock brake system), and/or TRC (traction control), based on the wheel speeds.

Since the calculation method of the wheel speed is common to the signals from the respective sensors 10, 10x, 10y, 10z, the present example will be described as to the structure for gaining the wheel speed (wheel speed information) from the output signal of the sensor 10 as a typical example of the four sensors for simplicity of description.

The ac signal outputted from the wheel speed sensor 10 is entered via an A/D converter 12 into a processor 24. More specifically, the A/D converter 12 samples the ac signal from the wheel speed sensor 10 at a predetermined sampling rate, converts each sampled signal to a digital signal, and supplies it to the processor 24.

The processor 24 processes the digital signals by use of programs stored in a ROM 16 to detect the wheel speed information and output it. The processor 24, ROM 16, and RAM 18 can be constructed of a microcomputer. The sensor will be described below in some detail.

Figure 2:
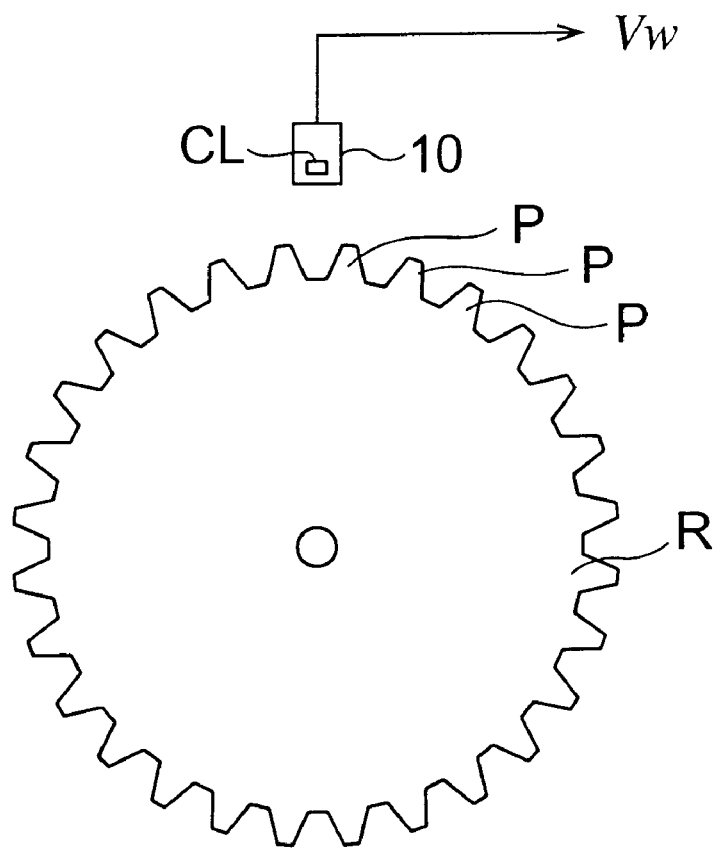
FIG. 2 is an explanatory diagram to show the relationship between the rotor R disposed on the same axis as the wheel $W_{FL}$, and the sensor 10.

FIG. 2 is an explanatory diagram to show the relation between a rotor (the rotor to be detected) R set on the same axis as the wheel $W_{FL}$, and the sensor 10. Tooth surfaces are formed in the circumference of the rotor R and with rotation thereof the shortest distance to the sensor 10 varies pulsatively. The sensor 10 outputs the signal Vw according to this distance variation.

Describing in more detail, the wheel speed sensor 10 and a coil CL thereof are located in the vicinity of the rotor (the rotor to be detected) R which is comprised of an electroconductive or magnetic body and the circumference (tooth surfaces) of which is constructed of a plurality of portions P arranged at predetermined intervals. The wheel speed sensor 10 is provided with the above coil CL in such a setup that when the portions P described above go into the vicinity of a magnetic field thereof with rotation, the coil CL outputs the ac signal Vw according to variation in eddy current or in magnetic permeability appearing in the portions P. The revolution speed of the wheel can be computed by extracting the angular frequency ω from this ac signal Vw and dividing it by the number N of teeth of the rotor.

FIG. 3 is a block diagram to show the internal structure of the processor 24. The signal Vw including the information of angular frequency ω of the above ac signal, supplied through the A/D converter 12 from the wheel speed sensor 10, is a digital signal, but it is assumed to be represented by Vw=Asinωt. The processor 24 may also be configured so as to be able to process the signal Vw in an analog state. Since the actual signal Vw includes the phase component and offset component, it is represented by the following: Vw=Asinωt+Bsin(ωt/N)+C. In this equation A, B and C are substantially constant. The "substantially constant" means inclusion of variations of ±10%. It is noted here that the above ac signal may also be expressed in the form of cos function instead of the sin function, and the ac signal in this case can also be handled in the same manner as the above.

This angular frequency ω is proportional to the revolution speed of the wheel; the higher the angular frequency ω, the higher the wheel speed; the lower the angular frequency, the lower the wheel speed.

The processor 24 extracts the angular frequency δ from the ac signal Vw and divides the extracted ω by the number N of teeth of the rotor R to obtain the wheel (revolution) speed (revolution speed ω/N (per 1 second)). Described herein is the extracting part of angular frequency ω as the main structure. The angular frequency extracting part (represented by 24) of the processor 24 is provided with a group of differentiators 24a, 24b and 24c for differentiating the ac signal Vw three times, and the first differentiator 24a is also used for the first differential of the ac signal Vw. These third and first differentials are supplied to a divider 24d, a division result is supplied to an amplifier 24e to invert the sign thereof, and thereafter the resultant signal is supplied to a square rooter 24f for calculating a square root thereof.

Through the differentiation of the ac signal Vw of the sine wave or the like, the angular frequency information ω becomes included in the amplitude component of signal. Through a plurality of differential operations the amplitude including the angular frequency information varies, but the time-dependent term becomes equal. Here the amplitude A (or a function of A and B) of the ac signal Vw outputted from the revolution speed sensor is substantially constant and, therefore, the angular frequency information ω can be extracted by determining a ratio thereof.

Namely, the input signal Vw, the first differential Vw', the second differential Vw'', the third differential V''', the quotient D (=Vw'''/Vw'), the inverse r(−D), and the square root S (=(−D)$^{1/2}$) are expressed as follows. It is, however, assumed that A >>Bω/N and ωcosωt≠0.
(Mathematical Expression)

$$Vw = A\sin\omega t + B\sin(\omega t/N) + C$$

$$Vw' = A\omega\cos\omega t + (B\omega/N)\cos(\omega t/N)$$

$$\approx A\omega\cos\omega t$$

$$Vw'' \approx -A\omega^2\sin\omega t$$

$$Vw''' \approx -A\omega^3\cos\omega t$$

$$D = Vw'''/Vw'$$

$$= -\omega^2$$

$$r = \omega^2$$

$$S = \omega$$

When ωcosωt=0, Vw'≈Aωcosωt+ε (where ε≈0).

AS described above, the above device is the revolution speed detecting apparatus for extracting the signal including the angular frequency information ω corresponding to the revolution speed from the ac signal Vw outputted from the revolution speed sensor 10, wherein the amplitude A (or the function of A and B) of the ac signal Vw is approximately constant and the ac signal Vw is differentiated so as to permit the angular frequency information o to be extracted by determining the ratio thereof.

When the ac signal Vw is a sine wave containing the noise component and/or the harmonic contents, the waveform of this signal is not a precise sine wave, but it is an approximate sine wave. In the present apparatus the ac signal Vw is an approximate sine wave; in other words, in addition to the wheel speed sensor 10 indicated in the present embodiment, any revolution speed sensor that generates the output approximated to a sine or cosine wave (trigonometric function), can also be applied to the present apparatus.

The present apparatus is able to detect the revolution speed precisely even in the extremely low speed range.

Since the present apparatus can restrain use of an integrator indispensable for the conventional operation, though not excluding it, it is able to decrease the time constant of the signal, so as to permit a stop judgment with high accuracy and an improvement in the detection accuracy of revolution speed to a stop. It is, however, noted that a low-pass filter or the like for removing the high-frequency noise may also be used as occasion may demand.

When the revolution speed sensor is the wheel speed sensor, the revolution speed of the wheel as a rotor to be detected can be detected with accuracy.

Further, the above-stated structure, though being simple, permits the detection of wheel speed with higher accuracy than by the conventional F/V conversion. The acceleration can also be determined with high accuracy by differentiating the wheel speed obtained and it is possible to perform high-accuracy vehicle behavior determination including vehicle behavior control, body displacement, vehicle stop determination, and so on by use of these.

The present invention provides the revolution speed detecting apparatus capable of detecting the revolution speed with improved detection accuracy, particularly, in the range from extremely low speed to a stop.

What is claimed is:

1. A revolution speed detecting apparatus for extracting a signal including angular frequency information corresponding to revolution speed form an alternating-current signal outputted from a revolution speed sensor, wherein the amplitude of said alternating-current signal is substantially constant, said apparatus comprising:

a circuit that receives the constant-amplitude alternating-current signal from said signal, and that differentiates said alternating-current signal several times so as to permit said angular frequency information to be extracted by determining a ratio of the differentiated signals.

2. The revolution speed detecting apparatus according to claim 1, wherein said alternating-current signal is an approximate sine or cosine wave.

3. The revolution speed detecting apparatus according to claim 1, wherein said revolution speed sensor is located near a rotor to be detected, said rotor being comprised of an electroconductive or magnetic body and the circumference of the rotor being comprised of a plurality of portions arranged at predetermined intervals, and wherein said revolution speed sensor comprises a coil for outputting said alternating-current signal according to variation in eddy current or in magnetic permeability of the magnetic body appearing in said portions when said portions go into the vicinity of a magnetic field of said coil with rotation.

4. The revolution speed detecting apparatus according to claim 1, wherein said revolution speed sensor is a wheel speed sensor.

* * * * *